US012679994B2

(12) United States Patent
Kim

(10) Patent No.: US 12,679,994 B2
(45) Date of Patent: Jul. 14, 2026

(54) PAINT COMPOSITION FOR VEHICLE INTERMEDIATE COATING WITH IMPROVED CHIPPING RESISTANCE

(71) Applicants: HYUNDAI MOTOR COMPANY, Seoul (KR); KIA CORPORATION, Seoul (KR)

(72) Inventor: Hwan Oh Kim, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 543 days.

(21) Appl. No.: 18/198,121

(22) Filed: May 16, 2023

(65) Prior Publication Data

US 2024/0124739 A1 Apr. 18, 2024

(30) Foreign Application Priority Data

Oct. 18, 2022 (KR) ........................ 10-2022-0133647

(51) Int. Cl.
| | |
|---|---|
| *C09D 167/02* | (2006.01) |
| *C08K 3/04* | (2006.01) |
| *C08K 3/22* | (2006.01) |
| *C09D 7/20* | (2018.01) |
| *C09D 7/65* | (2018.01) |
| *C09D 139/00* | (2006.01) |

(52) U.S. Cl.
CPC .............. *C09D 167/02* (2013.01); *C08K 3/04* (2013.01); *C08K 3/22* (2013.01); *C09D 7/20* (2018.01); *C09D 7/65* (2018.01); *C09D 139/00* (2013.01); *C08K 2003/2241* (2013.01)

(58) Field of Classification Search
CPC .......... C09D 167/02; C09D 7/20; C09D 7/65; C09D 139/00; C08K 3/04; C08K 3/22
USPC ......................................... 525/165
See application file for complete search history.

(56) References Cited

U.S. PATENT DOCUMENTS

| | | | |
|---|---|---|---|
| 2018/0010009 A1* | 1/2018 | Gibanel | ............. C08G 18/5024 |
| 2019/0308217 A1* | 10/2019 | Okazaki | .................. C09D 7/70 |
| 2021/0070697 A1* | 3/2021 | Knappke-Bongartz | ..................... C09D 4/00 |

FOREIGN PATENT DOCUMENTS

| | | |
|---|---|---|
| KR | 10-1506184 B1 | 3/2015 |
| KR | 10-2015-0073195 A | 6/2015 |

* cited by examiner

*Primary Examiner* — Deve V Hall
(74) *Attorney, Agent, or Firm* — Morgan Lewis & Bockius LLP

(57) ABSTRACT

A paint composition for vehicle intermediate coating including a polyester resin, a melamine resin, a color pigment, an extender pigment, cellulose nanofibers (CNFs), a dispersant, a surface conditioner, an antisagging agent, and a solvent. The extender pigment may include calcium carbonate ($CaCO_3$). The paint composition can impart improved chipping resistance to a paint film.

10 Claims, 1 Drawing Sheet

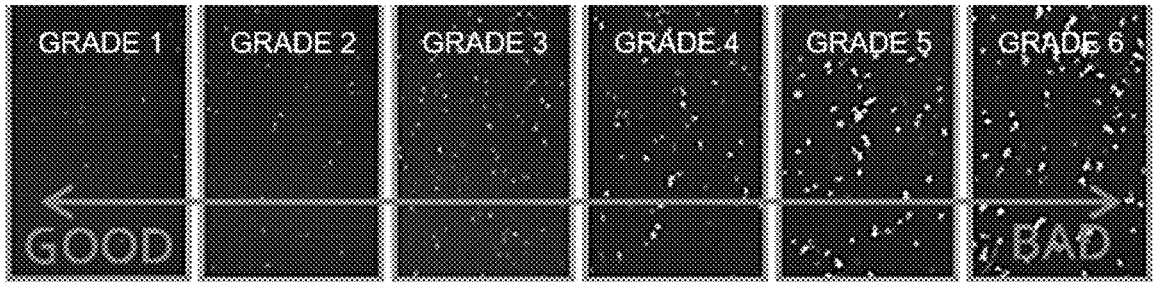

PAINT COMPOSITION FOR VEHICLE INTERMEDIATE COATING WITH IMPROVED CHIPPING RESISTANCE

CROSS-REFERENCE TO RELATED APPLICATION

This application claims under 35 U.S.C. § 119(a) the benefit of priority to Korean Patent Application No. 10-2022-0133647 filed on Oct. 18, 2022, the entire contents of which is incorporated herein by reference.

BACKGROUND

(A) Technical Field

The present disclosure relates to a paint composition for vehicle intermediate coating with improved chipping resistance.

(b) Background Art

Paint films for the exterior of a vehicle basically form a structure an electrodeposition layer, an intermediate coating layer, a base coating layer and a clear coating layer. Thereamong, the intermediate coating layer serves to protect the electrodeposition layer vulnerable to ultraviolet light, and to secure chipping resistance of the corresponding paint film. Here, chipping resistance indicates the ability of the paint film to resist damage to any portion of the surface thereof due to small stones, snow-melting salt, sand, etc. encountered during driving of the vehicle.

However, it is difficult to eliminate occurrence of damage to the intermediate coating layer having a thickness of about 20 to 35 μm due to fast collision of stones having higher hardness than polymers with current technology.

Therefore, in an effort to solve the above-described problem, research on a paint composition having improved chipping resistance (so as to minimize damage to a paint film) is required.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with the related art, and it is an object of the present disclosure to provide a paint composition for vehicle intermediate coating with improved chipping resistance, compared to the conventional paint compositions.

In one aspect, the present disclosure provides a paint composition including a polyester resin, a melamine resin, a color pigment, an extender pigment, cellulose nanofibers (CNFs), a dispersant, a surface conditioner, an antisagging agent, and a solvent.

In a preferred embodiment, the content of the polyester resin may be 15 to 20 wt %, the content of the melamine resin may be 7 to 13 wt %, the content of the color pigment may be 15.1 to 20.3 wt %, the content of the extender pigment may be 8 to 15 wt %, the content of the cellulose nanofibers (CNFs) may be 3 to 4 wt %, the content of the dispersant may be 0.5 to 1 wt %, the content of the surface conditioner may be 0.5 to 1.5 wt %, the content of the antisagging agent may be 4 to 6 wt %, and the content of the solvent may be 30 to 43 wt %, based on the total weight of the paint composition.

In another preferred embodiment, the color pigment may include titanium dioxide ($TiO_2$) and carbon black, and the content of the titanium dioxide ($TiO_2$) may be to 20 wt % and the content of the carbon black may be 0.1 to 0.3 wt %, based on the total weight of the paint composition.

In still another preferred embodiment, the extender pigment may include calcium carbonate ($CaCO_3$).

In yet another preferred embodiment, the cellulose nanofibers (CNFs) may have a width of 10 to 100 nm, and a length of 1 to 5 μm.

In still yet another preferred embodiment, the dispersant may include a silicone-free polyester polymer.

In a further preferred embodiment, the surface conditioner may include a silicone-modified acrylic resin.

In another further preferred embodiment, the antisagging agent may include at least one selected from the group consisting of acrylic derivatives and modified urethane.

In still another further preferred embodiment, the solvent may include distilled water, an alcohol-based solvent and a glycol-based solvent, and the content of distilled water may be 25 to 35 wt %, the content of the alcohol-based solvent may be 4 to 6 wt %, and the content of the glycol-based solvent may be 1 to 2 wt %, based on the total weight of the paint composition.

In one aspect, the present disclosure provides a paint film manufactured using the paint composition of claim 1. The paint film has a chipping resistance evaluation grade of Grade 2 or less as evaluated at an air pressure of 5 kgf/cm² and a temperature of −20° C. using as a gravelometer.

Other aspects and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawing which is given hereinbelow by way of illustration only, and thus is not limitative of the present disclosure, and wherein:

FIGURE is a diagram showing chipping resistance determination criteria in chipping resistance grade evaluation.

It should be understood that the appended drawing is not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the FIGURES, reference numbers refer to the same or equivalent parts of the present disclosure throughout the several FIGURES of the drawings.

DETAILED DESCRIPTION

The above-described objects, other objects, advantages and features of the present disclosure will become apparent from the descriptions of embodiments given hereinbelow with reference to the accompanying drawings. However, the present disclosure is not limited to the embodiments disclosed herein and may be implemented in various different forms. The embodiments are provided to make the description of the present disclosure thorough and to fully convey the scope of the present disclosure to those skilled in the art.

In the following description of the embodiments, terms, such as "including", "comprising" and "having", are to be interpreted as indicating the presence of characteristics, numbers, steps, operations, elements or parts stated in the description or combinations thereof, and do not exclude the presence of one or more other characteristics, numbers, steps, operations, elements, parts or combinations thereof, or possibility of adding the same.

All numbers, values and/or expressions representing amounts of components, reaction conditions, polymer compositions and blends used in the description are approximations in which various uncertainties in measurement generated when these values are acquired from essentially different things are reflected and thus it will be understood that they are modified by the term "about", unless stated otherwise. In addition, it will be understood that, if a numerical range is disclosed in the description, such a range includes all continuous values from a minimum value to a maximum value of the range, unless stated otherwise. Further, if such a range refers to integers, the range includes all integers from a minimum integer to a maximum integer, unless stated otherwise.

A paint composition according to the present disclosure includes a polyester resin, a melamine resin, a color pigment, an extender pigment, cellulose nanofibers (CNFs), a dispersant, a surface conditioner, an antisagging agent and a solvent.

Hereinafter, the respective components of the paint composition according to the present disclosure will be described in more detail.

(A) Polyester Resin

In the present disclosure, the polyester resin may be used as a base resin so as to provide to adhesiveness and main properties to the paint composition. The polyester resin serves to form the appearance characteristics and properties of a paint film manufactured using the paint composition including the polyester resin.

The content of the polyester resin may be 15 to 20 wt %, based on the total weight of the paint composition. When the content of the polyester resin is less than 15 wt %, the adhesive properties and main properties of the paint composition are reduced. On the other hand, when the content of the polyester resin exceeds 20 wt %, workability is reduced by use of the excessive amount of the polyester resin.

(B) Melamine Resin

In the present disclosure, the melamine resin may be used as a base resin so as to provide to hardenability and the main properties to the paint composition. The melamine resin serves to form the appearance characteristics and properties of the paint film manufactured using the paint composition including the melamine resin.

The melamine resin may include at least one selected from the group consisting of a butoxy and methoxy mixed melamine resin and a methylated melamine resin. For example, the melamine resin may include the butoxy and methoxy mixed melamine resin and the methylated melamine resin.

The content of the melamine resin may be 7 to 13 wt %, based on the total weight of the paint composition. When the content of the melamine resin is less than 7 wt %, the hardness of the paint film is reduced. On the other hand, when the content of the melamine resin exceeds 13 wt %, the paint film is excessively hardened and thus sanding workability is reduced.

(C) Color Pigment

The color pigment is colored powder, which is insoluble in water, oil and solvents, and endures sunlight, and is dispersed in resin varnish and used to allow the paint composition to have a designated color.

The content of the color pigment may be 15.1 to 20.3 wt %, based on the total weight of the paint composition. When the content of the color pigment is less than 15.1 wt % or exceeds 20.3 wt %, it is difficult to implement the designated color, and thus, the paint composition may include the color pigment which is within the above content range.

Concretely, the color pigment may include titanium dioxide ($TiO_2$) and carbon black. More concretely, the color pigment may include 15 to 20 wt % of titanium dioxide ($TiO_2$) and 0.1 to 0.3 wt % of carbon black, based on the total weight of the paint composition.

(D) Extender Pigment

The extender pigment may be a transparent white pigment with low coverage, which has a white color in the air, has a low refractive index, and thus becomes transparent when mixed with a vehicle.

In the present disclosure, the extender pigment may be used to improve workability.

The content of the extender pigment may be 8 to 15 wt %, based on the total weight of the paint composition. When the content of the color pigment is less than 8 wt %, coverage is reduced. On the other hand, when the content of the color pigment exceeds 15 wt %, the properties, including the adhesive properties, of the paint composition are reduced by use of the excessive amount of the extender pigment.

Concretely, the extender pigment may include calcium carbonate ($CaCO_3$).

(E) Cellulose Nanofibers (CNFs)

In the present disclosure, the cellulose nanofibers (CNFs) may be used to improve chipping resistance.

In the cellulose nanofibers (CNFs), wooden biomass or non-wooden biomass, which is a raw material of nanocellulose, forms a hard configuration through binding of cellulose with materials, such as hemicellulose and lignin, and generally has a fiber diameter of 1 to 100 nm.

The content of the cellulose nanofibers (CNFs) may be 3 to 4 wt %, based on the total weight of the paint composition. When the content of the cellulose nanofibers (CNFs) is less than 3 wt %, chipping resistance improvement effect is insignificant. On the other hand, when the content of the cellulose nanofibers (CNFs) exceeds 4 wt %, use of the excessive amount of the cellulose nanofibers (CNFs) has a negative influence on the adhesive properties of the paint composition.

The cellulose nanofibers (CNFs) may have a width of 10 to 100 nm, and a length of 1 to 5 μm. When the length of the cellulose nanofibers (CNFs) is less than 1 μm, the cellulose nanofibers (CNFs) do not exhibit the chipping resistance improvement effect, and, when the length of the cellulose nanofibers (CNFs) exceeds 5 μm, the cellulose nanofibers (CNFs) are tangled, and may thus clog a filter of a painting machine when a vehicle is coated with the paint composition.

(F) Dispersant

In the present disclosure, the dispersant may be used to uniformly disperse the cellulose nanofibers (CNFs).

The content of the dispersant may be 0.5 to 1 wt %, based on the total weight of the paint composition. When the content of the dispersant is less than 0.5 wt %, dispersion of the cellulose nanofibers (CNFs) is reduced and thus cellulose nanofibers (CNFs) may be aggregated. On the other hand, when the content of the dispersant exceeds 1 wt %, use of the excessive amount of the dispersant may reduce interlayer adhesion of the paint film.

Concretely, the dispersant may use a silicone-free polyester polymer.

(G) Surface Conditioner

In the present disclosure, the surface conditioner may be used to improve leveling of the paint composition.

The content of the surface conditioner may be 0.5 to 1.5 wt %, based on the total weight of the paint composition. When the content of the surface conditioner is less than 0.5 wt %, leveling of the paint composition is reduced. On the other hand, when the content of the surface conditioner exceeds 1.5 wt %, use of the excessive amount of the surface conditioner may reduce workability.

Concretely, the surface conditioner may use a silicone-modified acrylic resin.

(H) Antisagging Agent

In the present disclosure, the antisagging agent may be used to provide thixotropy to the paint composition.

The content of the antisagging agent may be 4 to 6 wt %, based on the total weight of the paint composition. When the content of the antisagging agent is less than 4 wt %, sagging performance of the paint composition is reduced. On the other hand, when the content of the antisagging agent exceeds 6 wt %, leveling of the paint composition is reduced.

Concretely, the antisagging agent may use at least one elected from the group consisting of acrylic derivatives, modified urethane and combinations thereof.

(I) Solvent

In the present disclosure, the solvent may be used to provide painting workability of the paint composition. The Concretely, the solvent may include distilled water, an alcohol-based solvent and a glycol-based solvent. More concretely, the solvent may include 25 to 35 wt % of the distilled water, 4 to 6 wt % of the alcohol-based solvent, and 1 to 2 wt % of the glycol-based solvent, based on the total weight of the paint composition.

When chipping resistance of a paint film manufactured using the paint composition according to the present disclosure is evaluated at an air pressure of 5 $kgf/cm^2$ and a temperature of $-20°$ C. using as a chipping testing apparatus called a gravelometer, the chipping resistance evaluation grade of the hardened paint film may be Grade 2 or less.

Particularly, the paint composition according to the present disclosure is not limited to a specific field of application, and may be applied as a paint for vehicle intermediate coating. Thereby, toughness of a paint film for intermediate coating is improved, and thus, damage to the paint film due to chipping by stones encountered during driving of a vehicle may be minimized.

Further, the paint composition according to the present disclosure may be applied to various fields including painting for plastics other than vehicle body painting.

Hereinafter, the present disclosure will be described in more detail through the following examples. The following examples serve merely to exemplarily describe the present disclosure, and are not intended to limit the scope of the invention.

EXAMPLE

Paint compositions were prepared using components in contents set forth in Table 1 below by a general method.

TABLE 1

| | Component (wt %) | Example 1 | Comp. example 1 | Comp. example 2 | Comp. example 3 | Comp. example 4 |
|---|---|---|---|---|---|---|
| Resin | (A) Polyester resin | 16.5 | 16.5 | 16.5 | 17.2 | 16.9 |
| | (B) Melamine resin | 11.0 | 11.0 | 11.0 | 11.8 | 11.3 |
| Pigment | (C-1) Color pigment 1 | 17.0 | 17.0 | 17.0 | 17.0 | 17.0 |
| | (C-2) Color pigment 2 | 0.3 | 0.3 | 0.3 | 0.3 | 0.3 |
| | (D) Extender pigment | 11.7 | 12.3 | 11.0 | 12.1 | 12.0 |
| Additives | (E) CNFs | 3.9 | — | 5.0 | 2.0 | 3.5 |
| | (F) Dispersant | 0.7 | — | 0.5 | 0.7 | 0.1 |
| | (G) Surface conditioner | 0.9 | 0.9 | 0.9 | 0.9 | 0.9 |
| | (H) Antisagging agent | 4.3 | 4.3 | 4.3 | 4.3 | 4.3 |
| Solvent | (I-1) DIW (distilled water) | 28.1 | 30.3 | 28.1 | 28.1 | 28.1 |
| | (I-2) Alcohol-based solvent | 4.1 | 5.5 | 4.1 | 4.1 | 4.1 |
| | (I-3) Glycol-based solvent | 1.5 | 1.9 | 1.5 | 1.5 | 1.5 |
| | Sum total | 100.0 | 100.0 | 100.0 | 100.0 | 100.0 |

Color pigment 1: White pigment ($TiO_2$)
Color pigment 2: Black pigment (Carbon black)
Extender pigment: $CaCO_3$
Cellulose nanofibers (CNFs): CNFs having a width of 10 to 100 nm and a length of 1 to 5 μm
Dispersant: silicone-free polymer
Surface conditioner: silicone-modified acrylic resin
Antisagging agent: acrylic derivative solvent serves to adjust viscosity of the paint composition so as to improve workability of the paint composition.

The content of the solvent may be 30 to 43 wt %, based on the total weight of the paint composition. When the content of the solvent is less than 30 wt %, the viscosity of the paint composition is raised, and thus, workability of the paint composition is reduced during spray painting. On the other hand, when the content of the solvent exceeds 43 wt %, the viscosity of the paint composition is reduced, and thus, workability of the paint composition is reduced during spray painting.

Test Example

Thereafter, chipping resistances of the paint compositions according to Example 1 and Comparative Examples 1 to 4 were measured by the following method, and measurement results are set forth in Table 2 below.

[Evaluation Method]

(1) Chipping Resistance: Paint Films manufactured using the respective paint compositions were evaluated under the following conditions using a gravelometer (i.e., a chipping test apparatus).

Air pressure: 5 kgf/cm², Temperature: −20° C., Use of 50 g of crushed stone JIS7

FIGURE is a diagram showing chipping resistance determination criteria in chipping resistance grade evaluation. Concretely, the chipping resistance determination criteria shown in the FIGURE were applied, and indicates that the lower the grade, the better the chipping resistance. In the present disclosure, it was determined that the chipping resistance of a paint film is excellent when the chipping resistance of the paint film satisfies Grade 2 or less.

TABLE 2

| Evaluation item | | Evaluation result | | | |
|---|---|---|---|---|---|
| | Example 1 | Comp. example 1 | Comp. example 2 | Comp. example 3 | Comp. example 4 |
| Chipping resistance | Grade 2.0 | Grade 3.0 | Grade 2.5 | Grade 3.0 | Grade 2.5 |

Referring to Table 2, it may be confirmed that the paint composition according to Comparative Example 1, in which the CNFs and any dispersant were not used, did exhibit little chipping resistance improvement effect, compared to the paint composition according to Example 1 of the present disclosure.

Further, it may be confirmed that the paint composition according to Comparative Example 2, in which the content of the CNFs exceeded 4 wt %, and the paint composition according to Comparative Example 3, in which the content of the CNFs was less than 3 wt %, exhibited little chipping resistance improvement effect, compared to the paint composition according to Example 1 of the present disclosure.

In addition, it may be confirmed that, in the paint composition according to Comparative Example 4, in which a proper CNF content was used but the content of the dispersant was less than 0.5 wt %, the CNFs were not sufficiently dispersed in the paint film, and thus, the paint composition according to Comparative Example 4 exhibited less chipping resistance improvement effect.

On the contrary, the paint composition according to Example 1 of the present disclosure was prepared by mixing the polyester resin, the melamine resin, the color pigment, the extender pigment, the cellulose nanofibers (CNFs), the dispersant, the surface conditioner, the antisagging agent, and the solvent in specific contents, and may thus improve chipping resistance of the paint film for intermediate coating, compared to the conventional paint compositions.

As is apparent from the above description, a paint composition according to the present disclosure is prepared by mixing a polyester resin, a melamine resin, a color pigment, an extender pigment, cellulose nanofibers (CNFs), a dispersant, a surface conditioner, an antisagging agent and a solvent in specific contents, thereby being capable of improving chipping resistance of a paint film for intermediate coating, compared to the conventional paint compositions.

Further, a paint film manufactured using the paint composition according to the present disclosure has excellent toughness, and may thus be applied to various fields, such as vehicle body painting and painting for plastics.

The disclosure has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A paint composition comprising:
a polyester resin;
a melamine resin;
a color pigment;
an extender pigment;
3 wt % to 4 wt % of cellulose nanofibers (CNFs), based on a total weight of the paint composition;
0.5 wt % to 1 wt % of a dispersant, based on the total weight of the paint composition;
a surface conditioner;
an antisagging agent; and
a solvent.

2. The paint composition of claim 1, wherein, based on the total weight of the paint composition, the paint composition comprises:
15 wt % to 20 wt % of the polyester resin;
7 wt % to 13 wt % of the melamine resin;
15.1 wt % to 20.3 wt % of the color pigment;
8 wt % to 15 wt % of the extender pigment;
0.5 wt % to 1.5 wt % of the surface conditioner;
4 wt % to 6 wt % of the antisagging agent; and
30 wt % to 43 wt % of the solvent.

3. The paint composition of claim 1, wherein the color pigment comprises titanium dioxide ($TiO_2$) and carbon black,
wherein, based on the total weight of the paint composition, the paint composition comprises:
15 wt % to 20 wt % of the titanium dioxide ($TiO_2$); and
0.1 wt % to 0.3 wt % of the carbon black.

4. The paint composition of claim 1, wherein the extender pigment comprises calcium carbonate ($CaCO_3$).

5. The paint composition of claim 1, wherein the cellulose nanofibers (CNFs) have a width of 10 to 100 nm, and a length of 1 to 5 μm.

6. The paint composition of claim 1, wherein the dispersant comprises a silicone-free polyester polymer.

7. The paint composition of claim 1, wherein the surface conditioner comprises a silicone-modified acrylic resin.

8. The paint composition of claim 1, wherein the antisagging agent comprises at least one selected from the group consisting of acrylic derivatives and modified urethane.

9. The paint composition of claim 1, wherein the solvent comprises distilled water, an alcohol-based solvent, and a glycol-based solvent,
wherein, based on the total weight of the paint composition, the paint composition comprises:
25 wt % to 35 wt % of the distilled water;
4 wt % to 6 wt % a content of the alcohol-based solvent; and
1 wt % to 2 wt % a content of the glycol-based solvent.

10. A paint film manufactured using the paint composition of claim 1, wherein the paint film has a chipping resistance evaluation grade of Grade 2 or less as evaluated at an air pressure of 5 kgf/cm² and a temperature of −20° C. using as a gravelometer.

* * * * *